Dec. 26, 1961  C. F. OLDERSHAW ET AL  3,014,702
HEAT EXCHANGER
Filed Dec. 1, 1958

INVENTORS.
Charles F. Oldershaw
BY Scott Lynn

ATTORNEY

3,014,702
HEAT EXCHANGER

Charles F. Oldershaw, Concord, and Scott Lynn, Walnut Creek, Calif., assignors to The Dow Chemical Company, Midland, Mich., a corporation of Delaware
Filed Dec. 1, 1958, Ser. No. 777,436
6 Claims. (Cl. 257—239)

This invention relates to a heat exchanger particularly adapted to the cooling of a high viscosity fluid.

While numerous types of heat exchangers are satisfactory for the modification of the temperature of a fluid having relatively low viscosity, these heat exchangers are frequently unsatisfactory for a highly viscous material or pseudoplastic material, such as molten polystyrene and other high polymers. Presently, to cool or heat a high viscosity fluid a scraped-wall type of heat exchanger is generally used. In these exchangers cumbersome scrapers moving in a rotating manner in a tube or the like deposit the viscous material on the heat exchange surface and remove it from the surface as it is moved through the equipment. The scraped-wall type of heat exchanger has numerous disadvantages. Its initial cost is high and also it is costly to operate. A great deal of mechanical energy is required to operate the scraper at the required speed, especially for the high viscosity materials, such as molten polymers. This energy is converted to heat and if the polymer is being cooled additional surface must be provided to remove this heat. Low heat transfer efficiencies are also obtained, since a layer of the material is generally maintained upon the heat exchange surface. When the scrapers are set so that a layer of the material will not remain upon the surface, the scrapers bear against the cooling surface resulting in metal impurities being intermixed with the material. Uniform cooling of the material is also difficult to obtain. The material scraped from the cooling or heating surface is at a different temperature from that of the bulk of the material. The agitation of the scraper, while sufficient to remove the material from the surface, does not thoroughly intermix the material obtained from the surface with the bulk of the material. Thus the temperature of the product obtained will not be uniform. The thermal conductivity of the highly viscous polymer materials is relatively low and a considerable length of time is necessary before a uniform temperature is reached throughout the whole material.

It is, therefore, an object of this invention to provide a heat exchanger which is particularly adapted for modifying the temperature of a highly viscous fluid. A further object is to provide a heat exchanger which is highly efficient and at the same time is capable of being manufactured and assembled at a relatively low cost. Other objects and advantages will become apparent as the description of this invention proceeds, reference being had to the accompanying drawing in which.

Figure 1:
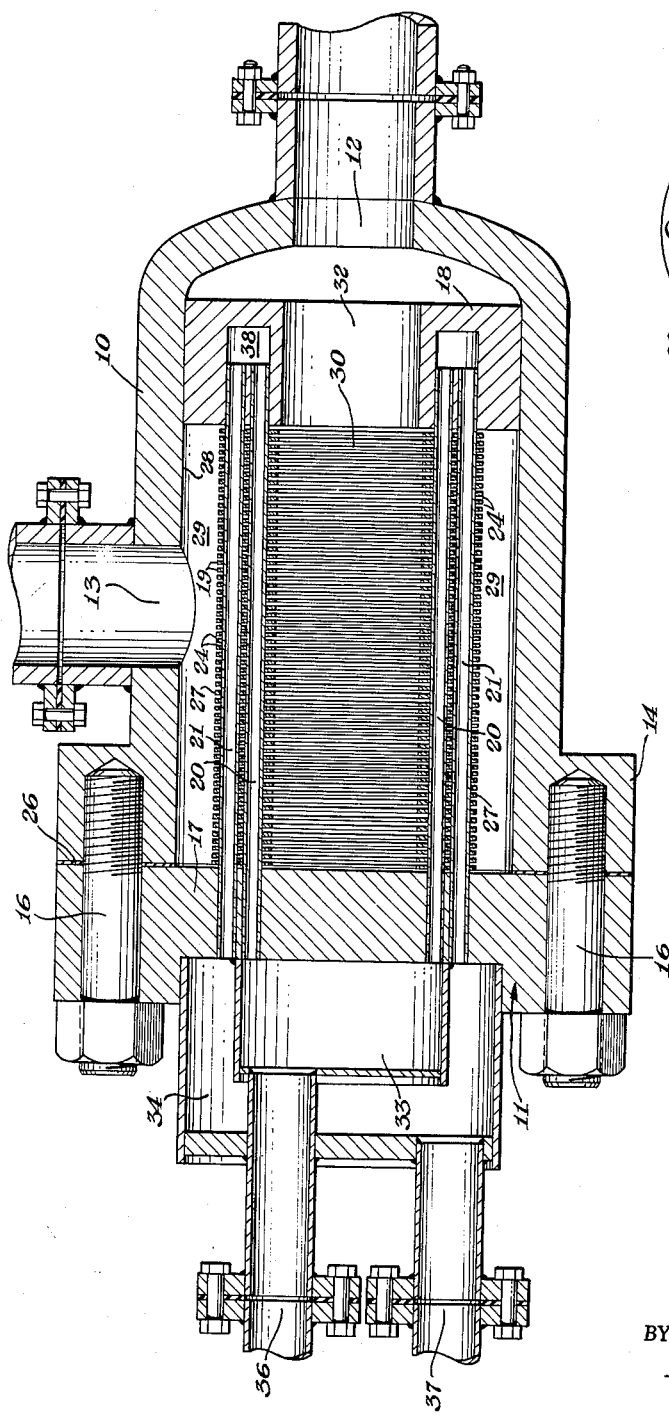
FIGURE 1 is a cross sectional view of a preferred form of a heat exchanger embodying the invention.

Referring now to FIGURE 1, the heat exchanger comprises a cylindrical shell 10 and a heat exchange element generally indicated as 11.

The shell 10 is open at one end and has an outlet 12 at the opposite end. An inlet 13 is also provided which is aligned perpendicularly to the longitudinal axis of the shell. The thickness of the shell is increased at the open end to form a collar 14 in which a multiplicity of studs 16 are inserted.

Figure 2:
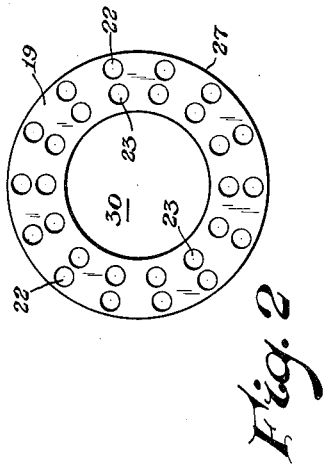
FIGURE 2 is a detailed elevation of one of the plates used in the heat exchanger shown in FIG. 1.

The heat exchange element comprises a header 17 adapted to close one end of said shell and to support one end of the heating element, an annular header 18 at the opposite end, and a multiplicity of perforated flat annular plates 19 and tubes 20 and 21. In FIGURE 2 a detail elevation of a plate 19 is shown. As shown the perforations 22 in the annular plate are equidistantly spaced in a circular manner. Perforations 23 are likewise equidistantly spaced but are on a circle of a smaller diameter. These plates are assembled uniformly on a common radial axis between headers 17 and 18 with essentially the same space 24 being provided between each of the plates. The perforations in the plates are aligned and open end tubes, which terminate in the headers, are inserted through the perforations. Thus, two circular rows of tubes are obtained with one row being located at a greater distance than the second from the longitudinal axis of the resulting tube bundle. The plates are secured to the tubes to insure a positive thermal contact between each tube and plate. This may be obtained by rolling, swaging or other controlled deformation techniques or it may be accomplished by brazing, soldering or otherwise joining each tube to each plate. The tubes are secured to the headers to form a fluid-tight joint. This may likewise be attained by either controlled deformation techniques or by attaching the tubes to the headers by brazing, soldering, or welding.

The heat exchange element 11 is positioned within shell 10 by bolting header 17 to the open end of the shell by use of studs 16. A gasket 26 is generally inserted between the end of the shell and header 17 to obtain a fluid-tight seal. When the heating element is inserted within the shell the outer periphery 27 of plates 19 are a distance apart from the inner wall 28 of the shell to provide an annular opening 29 between headers 17 and 18 which communicates with inlet 13 completely surrounding the outer periphery of plates 19. The inside opening 30 formed by the center aperture of annular plates 19 and the inner opening 32 of the annular header 18 communicates with the outlet 12.

Header 17 has two chambers, 33 and 34 respectively. Chamber 33 encompasses the open ends of the inner circular row of tubes 20 and communicates with an opening 36. Chamber 34 encompasses the open ends of the outer row of tubes 21 and communicates with an opening 37.

Header 18 has an annular passageway 38 within the header which communicates with the open ends of the tubes 20 and 21. Thus, the working fluid, which may be a coolant or a heating medium, may be introduced through opening 36 and directed to pass through the inner tubes 20 to the annular header 18. In header 18 the fluid is directed to the outer row of tubes 21 through which it flows before being discharged through opening 37. If desired the direction of flow in the tubes may be reversed. The working medium may be first introduced in the outer row of tubes and passed to the inner row before discharging the fluid from the exchanger. The passage of the working fluid through the tubes will modify the temperature of the plates as desired to either heat or cool them.

In operation of the heat exchanger the viscous fluid, which is to be cooled or heated, is introduced through inlet 13 and upon entering the heat exchanger flows into opening 29 surrounding the plates. The viscous fluid is then forced between plates from opening 29 into the inside opening 30 formed by the inner opening of the annular plates. From opening 30 the fluid will flow through the annular opening 32 of header 18 and from the heat exchanger through outlet 12.

In forming the heat exchange element a sufficient number of plates is assembled to give the required heat exchange area. The plates as assembled to form the heat exchange element serve a dual function. First they act as the heat exchange surface through which the heat is removed from or added to the viscous material as the case may be as it flows between the plates. Secondly, the plates support and strengthen the heat exchange element. Since a highly viscous fluid is used, a relatively high pressure drop across the heating element is obtained. Thus, the heat exchange element must be constructed to withstand a high pressure drop.

The optimum thickness, spacing, and width of the plates employed in the heat exchange element generally depend upon the physical and thermal properties of the material being cooled or heated. The thickness of the plates must be sufficient to furnish the necessary strength to the heating element. Usually thicker plates are used where higher pressure drops are to be expected. The spacing employed between the plates generally depends upon the thermal conductivity and viscosity of the material being heated or cooled. The spacing should be such that a flow of the material, e.g. polymer, may be obtained without having to employ extremely high pressures. At the same time, the plates should be close enough together so that the fluid forced between the plates will be in a sufficiently thin sheet to be heated or cooled to a substantially uniform temperature throughout its thickness. With materials having a relatively high thermal conductivity, a wider spacing may be employed, since a uniform temperature may be more easily maintained. For highly viscous materials it may be desired in some cases to use a wider spacing and pass the material between the plates at a reduced velocity. The width of the plates likewise will depend upon the viscosity of the material being treated. For more viscous materials, a narrower plate may be more desirable, since it would minimize the pressure drop.

A sufficient number of tubes is employed so that the plates may be maintained at the desired temperature. Generally it is desirable to maintain the temperature gradient across the face of the plate at a minimum.

It is apparent that the form of the heat exchanger embodying the principles of the invention may be considerably changed. If it is desirable to heat a highly viscous material, electrical energy may be used to heat the plates. The heat exchange element may then be constructed without the headers and the tubes. The plates may be made of electrically resistant material and assembled on rods instead of tubes. The rods may act as conductors or bus bars for the passage of electric current through the plates to heat them.

As shown in the drawing the heat exchange element 11 is slidably positioned within the shell. The heating element may be attached directly to the shell. The plates do not have to be annular. Plates of other shapes having an aperture in the center such as elliptical, rectangular, triangular, square, and polygonal may be used.

In a test of the heat exchanger, as described, a viscous fluid was distributed around the outer periphery of the plates and forced between the plates toward the center of the heat exchange element. If desired the flow may be reversed. That is, the material to be cooled or heated may be introduced through opening 12 into the center of the heat exchange element and forced between the plates to flow from the center to outer periphery of the plates to opening 29 and then be discharged through 13.

A heat exchanger similar to that shown in the attached drawing was used to cool 700 pounds per hour of a mixture composed of 90 parts of molten polystyrene and 10 parts by weight of methyl chloride. The molten polymer mixture was cooled from 147° C. to about 101° C. The zero shear viscosity of the mixture at 147° C. was $0.3 \times 10^6$ poises, while at the discharge temperature of 101° C., it was $1.8 \times 10^6$ poises.

The heat exchange element consisted of 108 annular steel plates having an outer diameter of 14 inches and an aperture having a diameter of 9¼ inches. These plates were spaced 0.105 inch apart and assembled on steel tubes having an outside diameter of ¾ inch and an inside diameter of 0.58 inch. Two circular rows of tubes were used. Each row had 10 tubes with one row having a diameter of 10⅞ inches and the second row a diameter of 12⅞ inches.

Cooling water at 100° C. was first passed through the outside tubes and then through the inner tubes at 50 gallons per minute before being discharged, partially vaporized, at 100° C.

In the operation, the molten polystyrene and methyl chloride mixture was introduced into the heat exchanger at 620 pounds per square inch gauge and the polymer issuing from the exchanger was at 290 pounds per square inch gauge. This stream of polymer was uniformly cooled as there was no variation in temperature across a cross section of the polymer stream in any direction. The operation was carried out under the above conditions for more than 30 days with continuing successful uniform cooling of the polymer.

What is claimed is:

1. A heat exchanger for highly viscous fluids, which comprises a shell having an inlet and an outlet, a multiplicity of flat plate heat exchange surfaces having an aperture in the center uniformly assembled perpendicularly to the longitudinal axis of said shell with a space of essentially the same magnitude between each of the individual plates, said plates being close together to thereby provide flow of the viscous fluid between the plates in a thin sheet, said multiplicity of said plates being encompassed by said shell with the inner walls of said shell being at a distance from the outer periphery of the plates to provide an opening between said inner wall and the outer periphery of said plates communicating with said inlet of said shell and the outlet of said shell communicating with the center aperture of the plates, and means to change the temperature of the plates.

2. A heat exchanger for highly viscous fluids, which comprises a shell having an inlet and an outlet, a multiplicity of perforated flat plate heat exchange surfaces having an aperture in the center uniformly assembled perpendicularly to the longitudinal axis of said shell with essentially the same space between each of the individual plates, said plates being close together to thereby provide flow of the viscous fluid between the plates in a thin sheet, said multiplicity of perforated plates being encompassed by said shell with the inner walls of said shell being at a distance from the outer periphery of the plates to provide an opening between said inner wall and the outer periphery of said plates communicating with the inlet of the shell and the outlet of the shell communicating with the center aperture of the plates, a multiplicity of open-end tubes passing through the perforations in said plates and secured thereto and headers attached to each end of said tubes, said headers having openings through which the working fluid may be introduced and removed after passing through the tubes to change the temperature of the plates.

3. A heat exchanger according to claim 2 wherein the plates are annular plates.

4. A heat exchanger for highly viscous fluids, which comprises a shell having an inlet and an outlet, said outlet being positioned at one end, and a heat exchanger element positioned within said shell comprising an annular header positioned at the outlet end of said shell, a second header positioned at a distance from said annular header, a multiplicity of perforated annular plate heat transfer surfaces uniformly assembled on a common radial axis between said headers with essentially the same space between each individual plate, said flat plate heat transfer surfaces being close together to thereby provide a flow of the viscous fluid between the plate heating surface in a thin sheet, a multiplicity of open-end tubes passing through the perforations in said annular plates and secured thereto, the ends of said tubes terminating in said headers and secured thereto with a fluid-tight joint, said heat exchange element being positioned in said shell with the inner wall of said shell being at a distance from the periphery of the annular plates to provide an opening between said inner wall and outer periphery of said plates between said headers communicating with the inlet to said shell and the outlet of said shell communicating with the opening formed by the inner peripheral area of said annular plates and annular header.

5. A heat exchanger according to claim 4 wherein the annular header has a passageway communicating with the open ends of all the tubes and the second header has two chambers, one of the chambers having an inlet communicating with the open ends of half of the tubes and the second chamber having an outlet communicating with the open ends of the remainder of the tubes.

6. A heat exchanger comprising a cylindrical shell having an inlet and an outlet, said outlet being positioned at one end and a heat exchange element comprising a header adapted to close one end of said shell and to support one end of heat exchange element, an annular header at the opposite end of the heat exchange element, a multiplicity of perforated plate heat exchange surfaces uniformly assembled on a common radial axis between said headers with essentially the same space between each of the individual plates, said plates being close together to thereby provide a flow of the viscous fluid between the plate heat exchange surfaces in a thin sheet, a series of open end tubes passing through the perforations in said plates and secured thereto with a fluid-tight seal, the end of said tubes terminating in the headers and secured thereto to form a fluid-tight joint, said heat exchange element being slidably positioned in said shell with the annular header being at the outlet end of the shell with the inner annular opening of the annular header and of the plates communicating with the outlet and the outer periphery of the annular plates between said header being at a distance from the inner wall of the shell forming an opening between the inner wall of the shell and the peripheral area of the plates between said headers communicating with the inlet of the shell.

References Cited in the file of this patent

UNITED STATES PATENTS

| | | |
|---|---|---|
| 1,096,273 | Sims | May 12, 1914 |
| 2,146,614 | Bergdoll | Feb. 7, 1939 |
| 2,606,006 | Karlsson et al. | Aug. 5, 1952 |

FOREIGN PATENTS

| | | |
|---|---|---|
| 664,304 | Great Britain | Jan. 2, 1952 |